United States Patent
Minard et al.

(10) Patent No.: US 12,114,678 B2
(45) Date of Patent: Oct. 15, 2024

(54) FITTING FOR EXTRUSION OF FROZEN FOOD PRODUCT

(71) Applicant: TAYLOR COMMERCIAL FOODSERVICE, LLC, Rockton, IL (US)

(72) Inventors: James J. Minard, Rockton, IL (US); Nathan A. Matz, Rockton, IL (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 207 days.

(21) Appl. No.: 17/615,224

(22) PCT Filed: Jul. 6, 2020

(86) PCT No.: PCT/US2020/040861
§ 371 (c)(1),
(2) Date: Nov. 30, 2021

(87) PCT Pub. No.: WO2021/007145
PCT Pub. Date: Jan. 14, 2021

(65) Prior Publication Data
US 2022/0225636 A1    Jul. 21, 2022

Related U.S. Application Data

(60) Provisional application No. 62/871,315, filed on Jul. 8, 2019.

(51) Int. Cl.
*A23G 9/28* (2006.01)
(52) U.S. Cl.
CPC ..................... *A23G 9/28* (2013.01)

(58) Field of Classification Search
CPC ....................................................... A23G 9/28
See application file for complete search history.

(56) References Cited

U.S. PATENT DOCUMENTS

D181,157 S     10/1957  Alfred
3,190,562 A *   6/1965  Atwood .................... A23G 9/20
                                                    239/323

(Continued)

FOREIGN PATENT DOCUMENTS

CN       1889849       1/2007
CN     101228916       7/2008

(Continued)

OTHER PUBLICATIONS

English Translation of First Office Action issued in CN202080049254.6 (Jul. 5, 2023).

(Continued)

*Primary Examiner* — J C Jacyna
(74) *Attorney, Agent, or Firm* — Barnes & Thornburg LLP

(57) ABSTRACT

A fitting for extruding a frozen food product is provided. The fitting is adapted to produce multiple parallel streams of flowable frozen food that resembles pasta. The fitting includes a body with an open end at a first end of the body and a partially closed second end of the body opposite the first side of the body, the partially closed second end comprising a plurality of holes that extend therethrough. An inner surface of the body includes a cylindrical portion and an arcuate portion, the arcuate portion disposed proximate to the open end and the cylindrical portion disposed between the arcuate portion and the partially closed end, wherein an inner diameter along the arcuate portion is smaller than an inner diameter along the cylindrical portion.

28 Claims, 14 Drawing Sheets

(56) References Cited

U.S. PATENT DOCUMENTS

| | | | |
|---|---|---|---|
| 3,230,926 A * | 1/1966 | MacManus | A23G 9/28 |
| | | | 118/24 |
| 3,301,440 A * | 1/1967 | Carpigiani | A23G 9/282 |
| | | | 222/135 |
| 3,746,320 A * | 7/1973 | Van Camp | F02M 17/04 |
| | | | 261/78.1 |
| 5,486,100 A | 1/1996 | Hsu | |
| 6,012,488 A | 1/2000 | Nichols | |
| 6,490,872 B1 | 12/2002 | Beck et al. | |
| 6,494,055 B1 | 12/2002 | Meserole et al. | |
| 6,553,779 B1 | 4/2003 | Boyer et al. | |
| 6,735,967 B1 | 5/2004 | Bishcel et al. | |
| 6,892,899 B2 | 5/2005 | Minard et al. | |
| 6,948,327 B2 | 9/2005 | Bischel et al. | |
| 6,986,441 B2 | 1/2006 | Scordato et al. | |
| 7,048,523 B2 | 5/2006 | Bush et al. | |
| D534,393 S | 1/2007 | De Groote | |
| 7,207,510 B2 | 4/2007 | Wong | |
| 7,278,276 B2 | 10/2007 | Boyer et al. | |
| 7,299,944 B2 | 11/2007 | Roady et al. | |
| 7,318,666 B1 | 1/2008 | Lin | |
| 7,798,367 B2 | 9/2010 | Minard | |
| 8,025,184 B2 | 9/2011 | Minard | |
| 8,240,909 B2 | 8/2012 | Athey | |
| 8,365,547 B2 | 2/2013 | Bravo et al. | |
| 8,714,410 B2 | 5/2014 | Wadle et al. | |
| D712,696 S | 9/2014 | Huber | |
| 9,487,383 B2 | 11/2016 | Minard et al. | |
| 9,689,606 B2 | 6/2017 | Bucceri | |
| D885,116 S | 5/2020 | Krivos | |
| D885,822 S | 6/2020 | McConnell | |
| 2005/0072799 A1 | 4/2005 | Stratton | |
| 2007/0241140 A1 * | 10/2007 | Cocchi | A23G 9/281 |
| | | | 222/509 |
| 2008/0148965 A1 | 6/2008 | Bravo et al. | |
| 2008/0302818 A1 | 12/2008 | Minard et al. | |
| 2009/0183779 A1 * | 7/2009 | Minard | F16K 15/147 |
| | | | 137/15.19 |
| 2012/0104046 A1 | 5/2012 | Wadle et al. | |
| 2019/0281859 A1 * | 9/2019 | Bischel | A23G 9/28 |

FOREIGN PATENT DOCUMENTS

| | | |
|---|---|---|
| CN | 101933554 | 1/2011 |
| CN | 103402365 | 11/2013 |
| CN | 109922665 | 6/2019 |
| EP | 2267340 | 12/2010 |
| WO | 2004054380 | 7/2004 |

OTHER PUBLICATIONS

Search Report & Written Opinion issued in Int'l Appl. No. PCT/US2020/040861 (2020).

Thomas, Pete, "How to Prepare Spaghetti Ice Cream," retrieved from the Internet at: https://www.youtube.com/watch?v=jw-oTSU-JOM, (Oct. 31, 2016).

English Translation of Second Office Action issued in CN202080049254.6 (Jan. 23, 2024).

English Translation of Third Office Action issued in CN202080049254.6 (May 24, 2024).

* cited by examiner

US 12,114,678 B2

FITTING FOR EXTRUSION OF FROZEN FOOD PRODUCT

CROSS-REFERENCE TO RELATED APPLICATIONS

This application is a U.S. nationalization under 35 U.S.C. § 371 of International Patent Application No. PCT/US2020/040861, filed Jul. 6, 2020, which claims priority from U.S. Provisional Application No. 62/871,315, filed on Jul. 8, 2019. The disclosures set forth in the referenced applications are incorporated herein by reference in their entireties.

BACKGROUND

This disclosure is directed to a fitting for extruding ice cream, frozen yogurt or other frozen food products from a machine. It is known to extrude ice cream into desired cross-sectional shapes. The disclosed fitting herein improves upon known extrusion techniques.

BRIEF SUMMARY

A first representative embodiment of the disclosure is provided. The embodiment includes a fitting for a machine to dispense frozen food product. The fitting includes a body with an open end at a first end of the body and a partially closed second end of the body opposite the first side of the body, the partially closed second end comprising a plurality of holes that extend therethrough, the body comprises an outer surface and an inner surface, wherein the body and the second end define an inner volume within the body. The inner surface includes a cylindrical portion and an arcuate portion, the arcuate portion disposed proximate to the open end and the cylindrical portion disposed between the arcuate portion and the partially closed end, wherein an inner diameter along the arcuate portion is smaller than an inner diameter along the cylindrical portion.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 12:
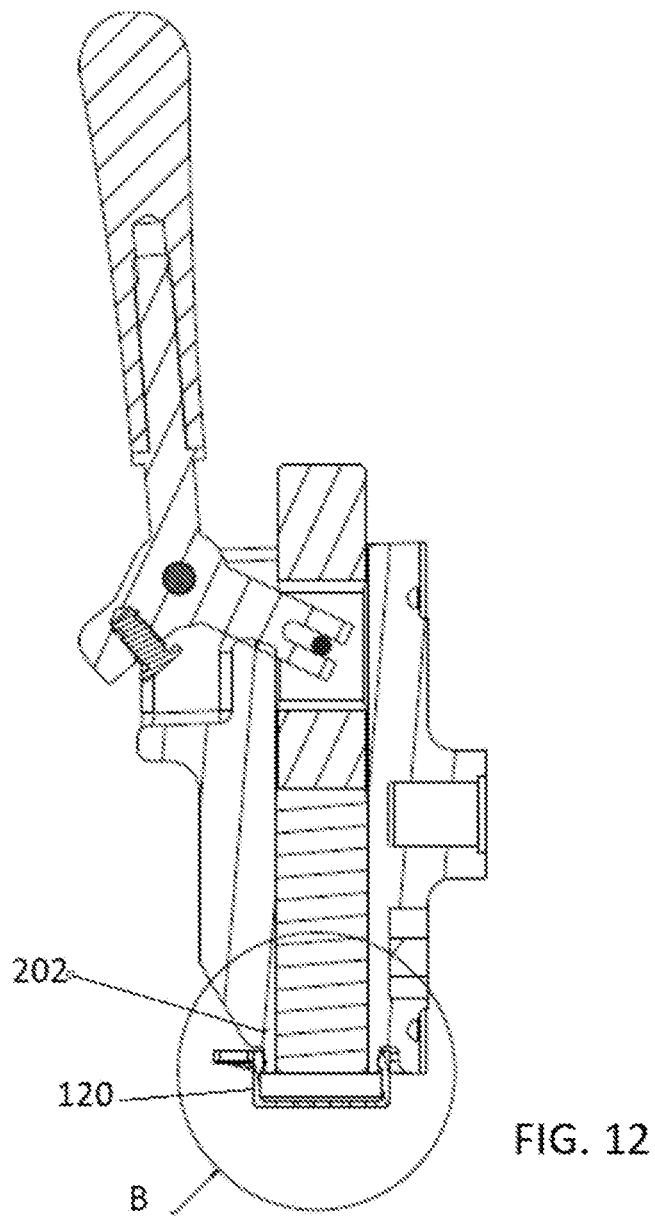
FIG. 12 is another cross-sectional view of FIG. 1 depicting the fitting of FIG. 8 disposed upon the draw valve.
Figure 13:
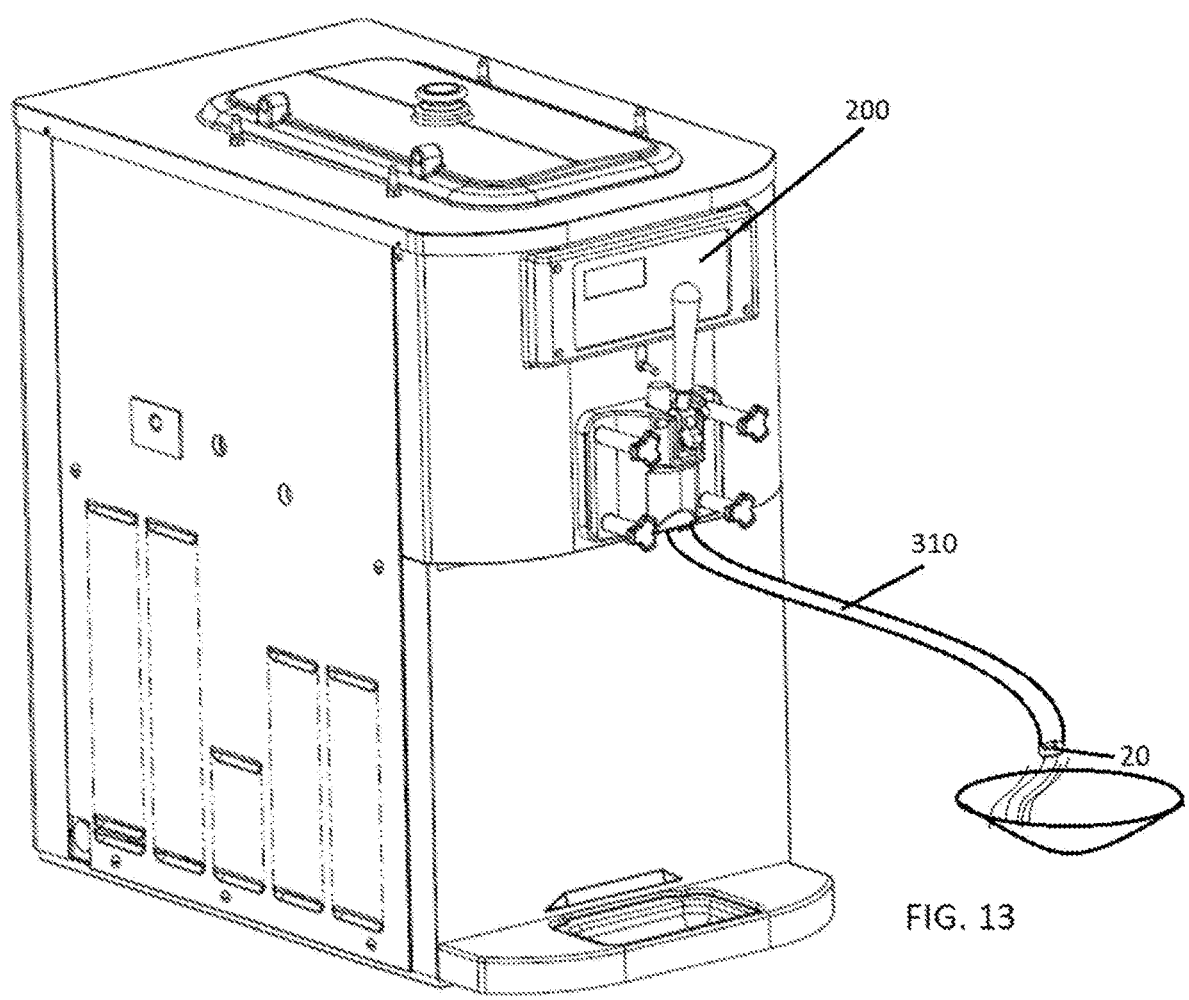
FIG. 13 is a perspective view of an ice cream machine, with a hose attached to the draw valve and the fitting of FIG. 1A attached to the end of the hose, with a plurality of parallel flows of ice cream depicted schematically being disposed into a bowl disposed therebelow.

Turning now to FIGS. 1-13 fittings 20 and 120 that are suitable for connection to a draw valve 202 of a conventional ice cream machine 200, or to another machine that produces a continuous volume of food product are provided. While the disclosed fittings can be used with a plurality of different types of machines, the fittings are depicted and described herein with respect to a machine that produces soft-serve ice cream, frozen yogurt, or the like (described herein globally as soft-serve ice cream for the sake of brevity although this term as used below encompasses other types of food products as well). One of ordinary skill in the art with a thorough review and understanding of this specification will readily comprehend how fittings that are suitable for other continuously extruded food products would be constructed without undue experimentation. For the sake of brevity, this specification and figures will be described with respect to a soft-serve ice cream machine. The fittings 20/120, which are described in detail below, are adapted, when installed upon a soft serve ice cream machine to cause extrusion of a plurality of parallel steams of soft serve ice cream that are shaped like different types of pasta, such as spaghetti, linguini, or fettuccini (as schematically depicted in the embodiment of FIG. 13, which includes the fitting 20 attached to the end of a hose 310, although the parallel flows of ice cream from the fitting 20 connected directly to the draw valve would be similar). The extruded soft serve ice cream may be presented by the user on a bowl or on a plate to a customer at the point of sale and marketed as ice cream pasta or the like.

A first embodiment of a fitting 20 is best shown in FIGS. 1A-7. The fitting 20 includes a body 22 that extends between an open end 24 and a partially closed second end 26, that is opposite from the first end 24. The body 22 and the partially closed second end collectively define an inner volume 25. The body of the fitting 20 may be positioned upon the end of the draw valve 202 (FIGS. 1A and 1B and FIG. 4a in an alternate embodiment) such that soft serve ice cream that exits the draw valve 202 enters into the inner volume 25 and is pushed through a plurality of apertures 27 through the partially closed end 26. Soft serve ice cream leaving the draw valve 10 leaves at an elevated pressure (above atmospheric pressure) and the backpressure of the flowing soft serve ice cream urges the soft serve ice cream to flow through the inner volume 25 and to be extruded through the plurality of apertures 27.

Figure 3:
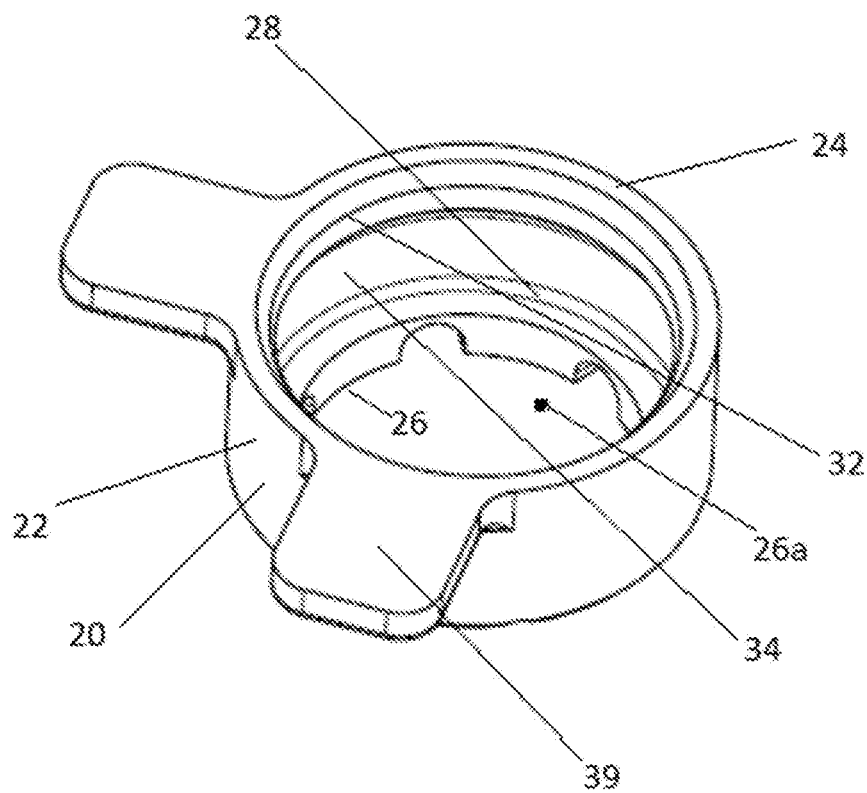
FIG. 3 is a top perspective view of the fitting of FIG. 2 with the disk removed.
Figure 4:
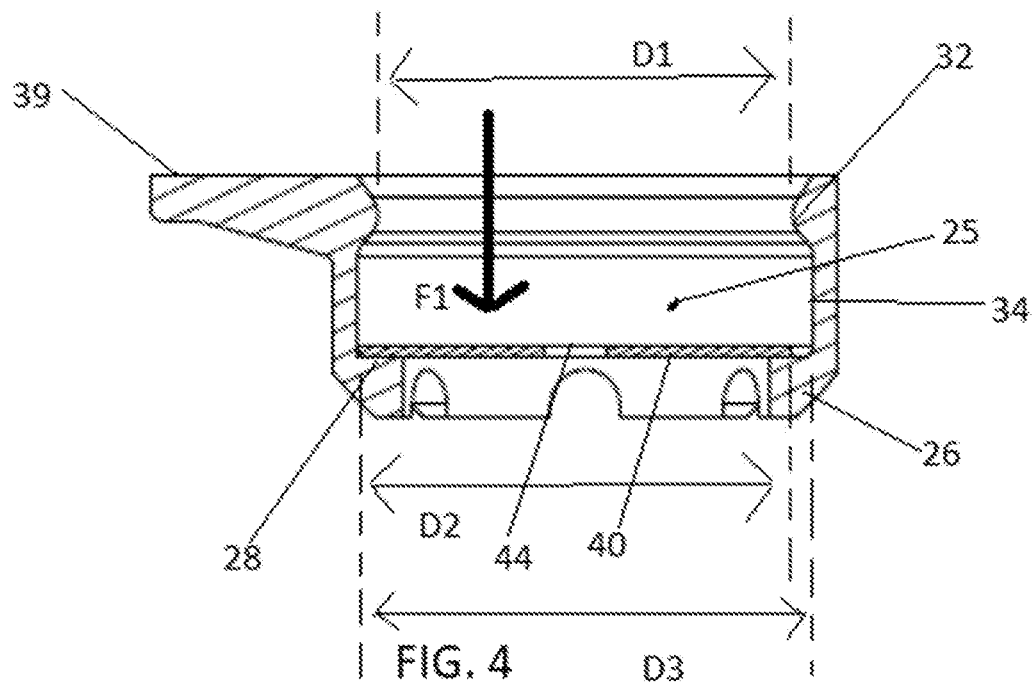
FIG. 4 is a cross-sectional view of the fitting of FIG. 2.

The partially closed end 26 of the fitting 20 includes an aperture 26a that has a smaller diameter than an inner diameter of the cylindrical portion 34 of the side wall 22 of the body. The intersection between the cylindrical portion 34 and the wall that defines the aperture 26 establishes a ledge 28, which is best shown in FIGS. 3 and 4. In some embodiments where the body 22 is cylindrical the cylindrical portion 34 and the aperture 26a include the same centerline, and the inner edge of the ledge 28 is similarly circular with the same centerline/center point.

In some embodiments, the inner surface of the side wall 22 includes a cylindrical portion 34 and an arcuate portion 32. The arcuate portion 32 may be disposed proximate to the open end 24 and the cylindrical portion 34 may be disposed between the arcuate portion 32 and the partially closed end 26. In some embodiments, the ledge 28 extends radially inwardly from the inner surface of the cylindrical portion 34. With reference to FIG. 4, the inner diameter of the cylindrical portion 34 is depicted as distance D3. The ledge 28 is provided to receive a disk 40, discussed below, thereon.

Figure 1:
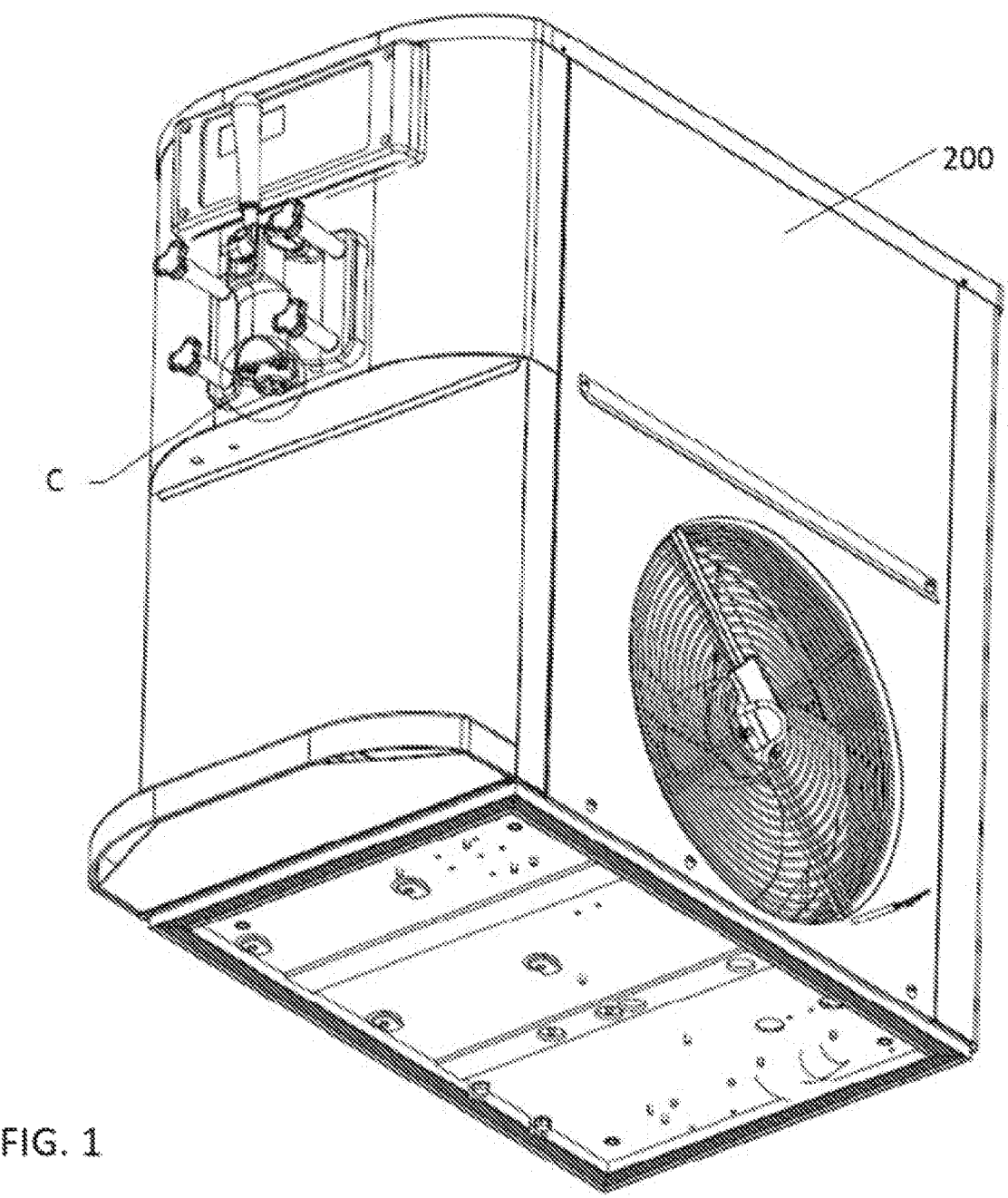
FIG. 1 is a perspective view of a fitting to dispense frozen food product installed upon a draw valve of a conventional soft-serve ice cream machine.
Figure 1A:
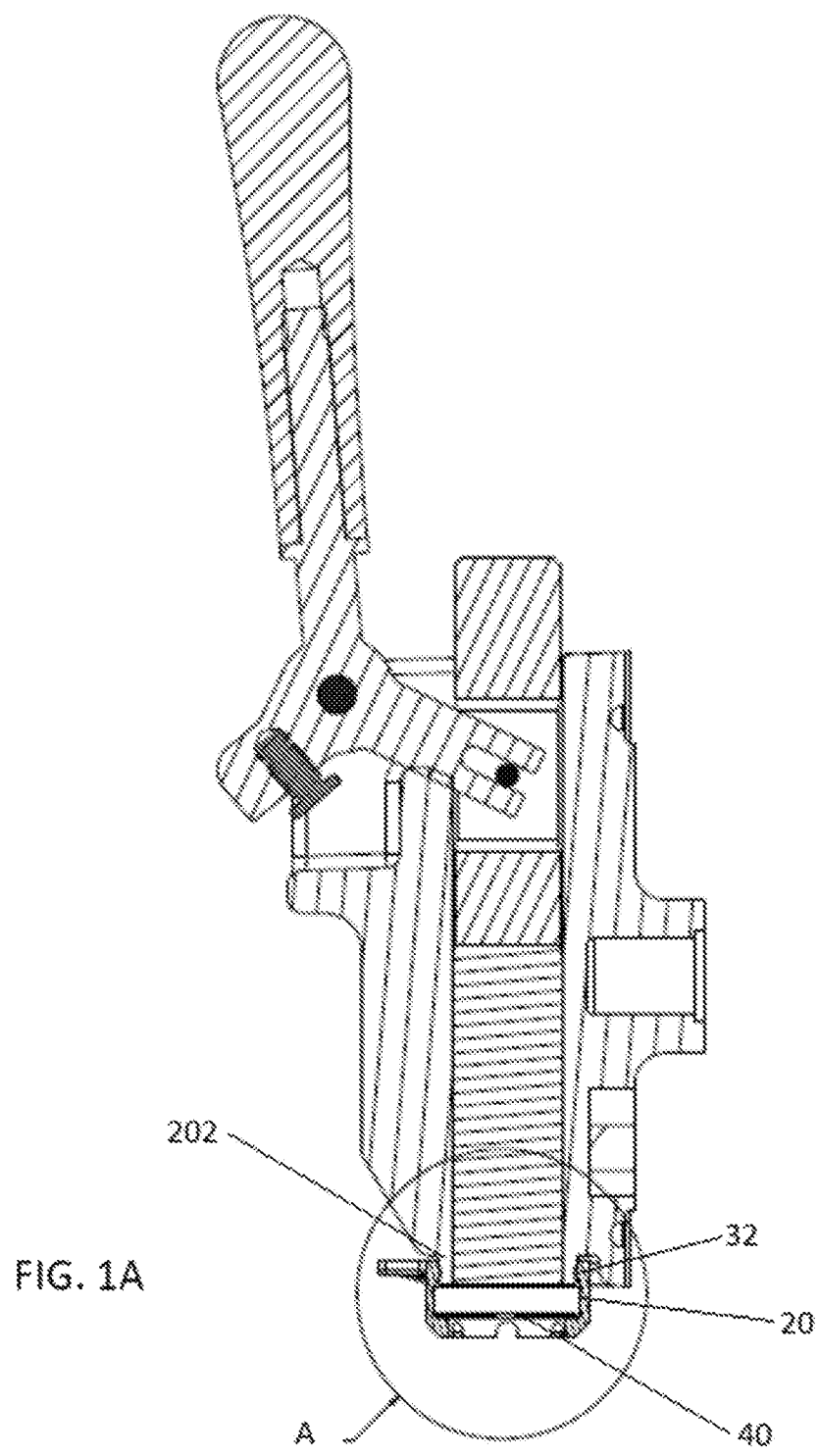
FIG. 1A is a cross-sectional view of FIG. 1 depicting the fitting installed upon the draw valve.
Figure 1B:
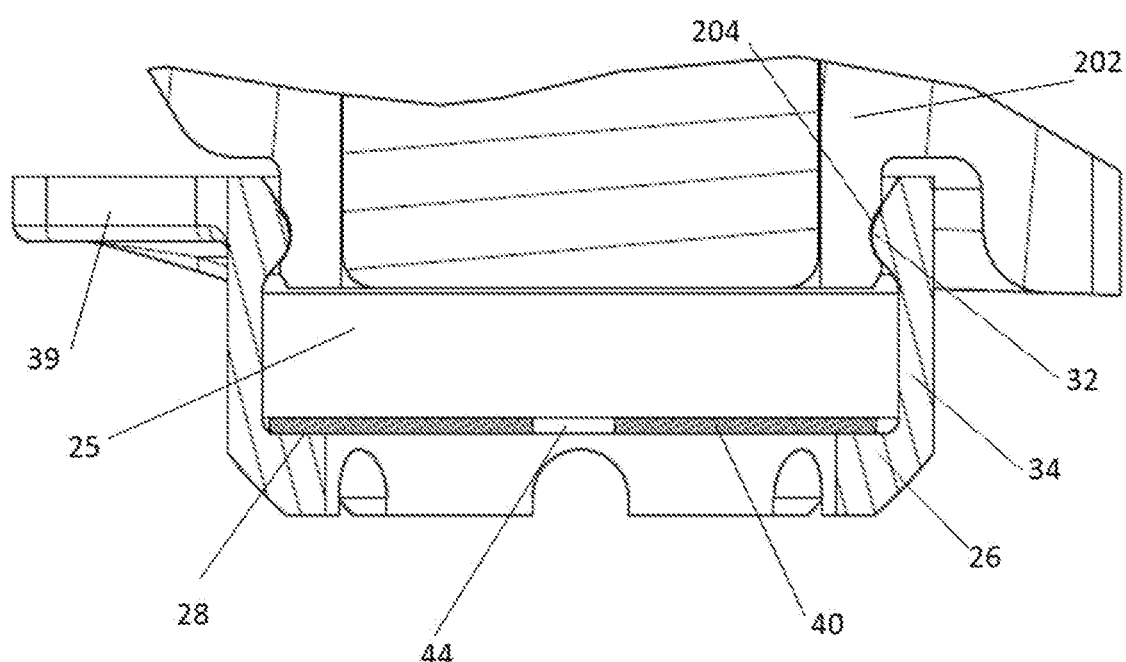
FIG. 1B is a view of detail A of FIG. 1A, depicting an arcuate portion of the body of the fitting of FIG. 1A disposed within a recess in the draw valve.
Figure 2:
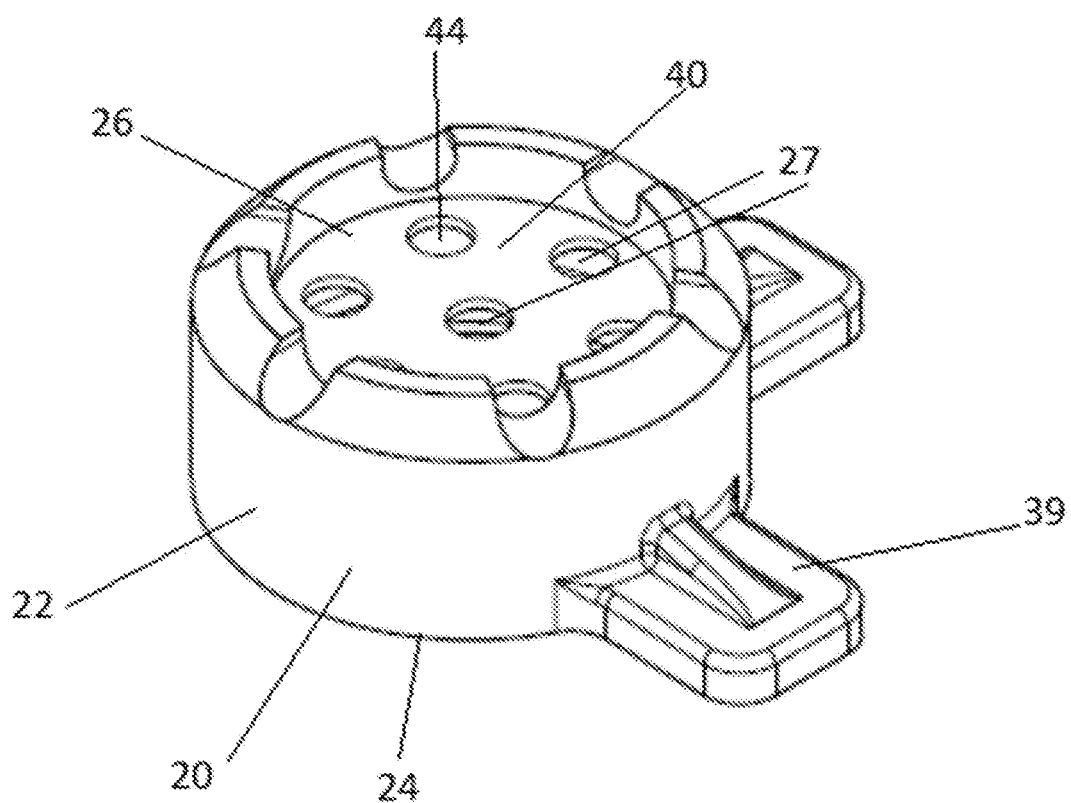
FIG. 2 is a bottom view of a fitting suitable to be disposed upon a draw valve of a conventional soft-serve ice cream machine.

The arcuate portion 32 may include an inner diameter that with an inner diameter that changes along its length, such as to form an arcuate cross-sectional profile as best shown in FIGS. 1B and 4. The arcuate portion 32 includes an inner diameter that is depicted as D1 in FIG. 4, and in some embodiments a continuous or discontinuous range of inner diameters from the smallest inner diameter D1 through a range that meets with the inner diameter D3 of the cylindrical portion 34 and the inner diameter at the open end 24 of the body 22. In some embodiments, the smallest inner diameter D1, which may be at the central portion of the arcuate portion may be smaller than an outer diameter of the disk (D2, FIG. 4) such that the disk 40 does not fall out of the fitting 20 when the fitting 20 in an orientation with the open end 24 facing downwardly.

In some embodiments, the body 22 may be formed from an elastomeric material, such as rubber or soft flexible plastics such as polyethylene or polypropylene to allow the body 22 to be temporarily (elastically) deformed by the user. Specifically, opposite sides of the body 22 may be squeezed toward each other (with elastic deformation, and not plastic deformation), which urges the sides that are approximately ninety degrees away from the positions that are being squeezed together to move apart from each other, which increases the inner distance between those points on the arcuate portion 32 to a distance that is greater than the diameter of the disk 40. Alternatively, the user may pull opposite sides away from each other to increase the inner distance between those points being pulled. This allows the user to remove the disk 40 from the inner volume 25 or insert different disk into the inner volume 25. Because the body 22 is manipulated with only elastic deformation, when the body 22 is released, the body 22 returns to the generally cylindrical configuration, with the inner diameter D1 at the arcuate portion 32 again less than the outer diameter of the disk 40.

Figure 4A:
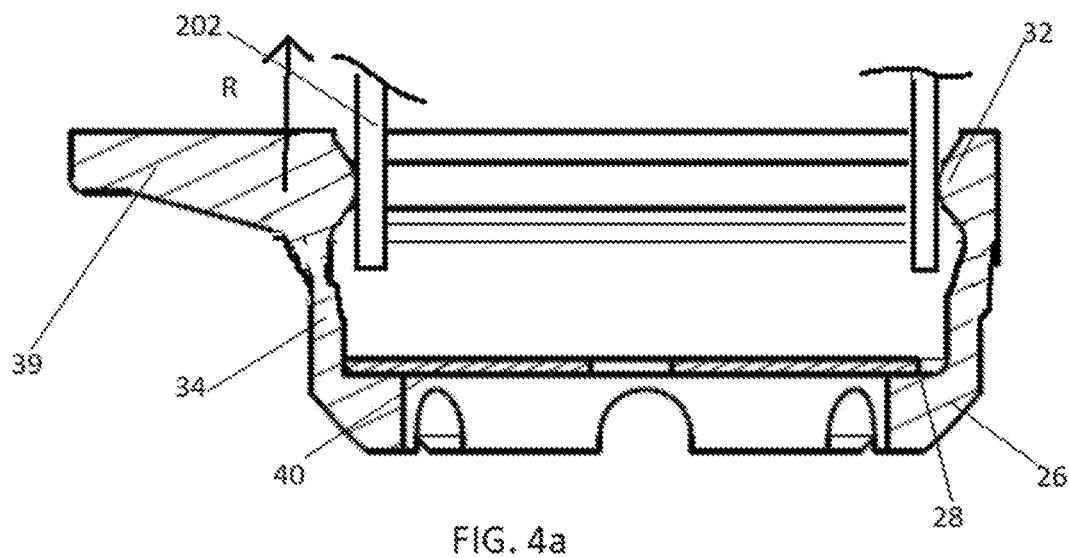
FIG. 4a is a schematic cross-sectional view showing the fitting of FIG. 2 slid upwardly along the outer surface of a draw valve of a conventional soft-serve ice cream machine, in an embodiment where the outer surface of the draw valve is cylindrical.

The inner diameter of the arcuate portion 32 of the body 22 may less than the outer diameter of the end of the draw valve 202. Because the material that forms the body 22 is elastic, as the body 22 approaches the end of the draw valve 202 (with the fitting moved in the direction R of FIG. 4a) and the draw valve 202 is just inserted within the inner volume 25, the outer surface of the draw valve 202 contacts the beginning of the arcuate portion 32. As the fitting is urged upwardly in the direction R with respect to the draw valve 202, normally by the user pulling upward on the handle 39 or handles 39 that extend radially from the body 22, the arcuate portion 32 slides upwardly along the outer surface of the draw valve 202 while expanding the inner diameter of the body until the distance D1 (the inner diameter of the smallest diameter portion of the arcuate portion 32, as depicted in FIG. 4) equals the outer diameter of the draw valve 202, as shown in FIG. 4a. The expanded body applies a large compression force upon the draw valve 202 (due to the elastic deformation of the body 22), which creates a large frictional force between the inner surface of the body 22 and the outer surface of the draw valve. The frictional force, which resists relative sliding motion between the body 22 and the draw valve 202 is greater than the force F1 applied to the disk 40 as soft serve ice cream flows into the internal volume 25 of the body and pushes against the surface of the disk 40 without holes (44, 45, or 46). The force F1 is equal to the pressure of the soft serve ice cream within the body multiplied by the area of solid portions of the disk 40 (i.e. the surface of the disk 40 without holes (44, 45, or 46)). Due to this arrangement, and specifically the large frictional force opposing sliding motion between the body 22 and the draw valve 202, the fitting stays in place upon the draw valve 202 as soft serve ice cream flows through the fitting 10, with a portion of the pressure of the soft serve ice cream imparted upon the disk 40, and some soft serve ice cream being extruded through the plurality of apertures 27 in the disk, as discussed below. In some embodiments as shown in FIGS. 1A and 1B and 12 and 12A, the draw valve 202 may include a recessed portion 204. The recessed portion 204 may extend around the entire circumference of the outer surface of the draw valve 202 and may provide a void that is adapted to receive the arcuate portion 32 of the fitting when positioned in registry with the recessed portion 204. As can be understood, the engagement between the arcuate portion 32 and the recessed portion 204 increases the resistance to the fitting sliding along the draw valve due to the force F1 of the ice cream onto the disk 40, and also allows the body 22 of the fitting to compress toward the draw valve for further contact between the internal walls of the body 22 and the draw valve, as depicted in FIG. 1B to increase the frictional force therebetween.

The disk 40 may include a plurality of apertures 27 to allow, when installed, soft serve ice cream to be extruded therethrough. The apertures 27 may be sized, shaped, and positioned, such that a plurality of parallel streams of soft serve ice cream may simultaneously be extruded therethrough. In some embodiments, the disk 40 may have a plurality of round apertures 44 that are sized with an diameter to cause the extruded soft serve ice cream to resemble spaghetti noodles, with the plurality of "noodles" being simultaneously extruded when falling onto a bowl or plate disposed below the fitting 10 to resemble spaghetti on the plate. In other embodiments, an alternate disk may include a plurality of rectangular holes (45, FIG. 6; 46, FIG. 7) that are sized and positioned to cause the soft serve ice cream being extruded through the disk to have generally rectangular shape that resembles linguini or fettuccini pasta. The term "generally" is defined herein to include exactly rectangular as well as shapes that include a longer dimension in cross-section and an opposed shorter dimension in cross-section, often with rounded edges between the "sides" that form the longer and shorter dimensions. Accordingly, cross-sections that are not geometrically rectangular but include opposed longer sides and opposed shorter sides are generally rectangular. Further cross-sections that include two opposite sides that are connected with curved ends are also generally rectangular. Additionally cross-sections that have opposed longer sides that are not exactly planar are also generally rectangular. In some embodiments, the plurality of holes may be geometrically rectangular, but produce an extruded generally rectangular stream of soft serve ice cream downstream of the geometrically rectangular hole due to the nature of soft serve ice cream or other similar food products.

Figure 7:
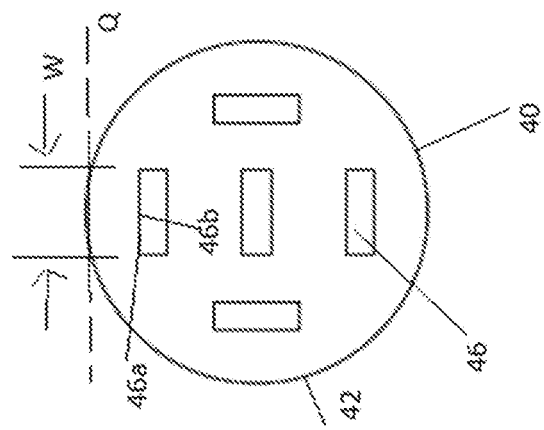
FIG. 7 is a top view of yet another disk for insertion into the fitting of FIG. 2, the disk being configured to extrude multiple parallel rectangular streams of soft-serve ice cream.
Figure 6:
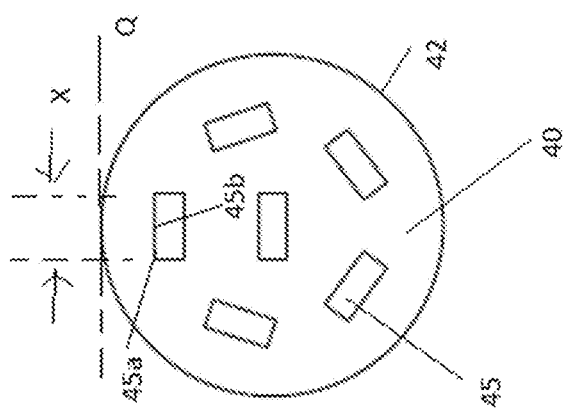
FIG. 6 is a top view of another disk for insertion into the fitting of FIG. 2, the disk being configured to extrude multiple parallel rectangular steams of soft-serve ice cream.

In representative embodiments, a disk 40 may include a plurality of holes, with a first hole 27 disposed at the center of the disk 40, and the remaining holes 27 disposed around the central hole and spaced radially outward from the first hole. In some embodiments, the radial outward holes are disposed at the same arc lengths from neighboring radial outward holes, as shown with arc lengths Z and Y in FIG. 5. In some embodiments, the holes 27 may be round (44, FIG. 5), while in other embodiments, the holes 27 may be rectangular or generally rectangular (45, FIG. 6, 46, FIG. 7). In some embodiments depicted in FIGS. 6 and 7, the longer surface 45*a*/46*a* of the rectangular or generally rectangular hole may be disposed such that a midpoint 45*b*/46*b* of the longer surface is about parallel to a tangent line Q of the disk at a point closest to the midpoint of the longer surface of the rectangular hole. The disk 40 in FIG. 6 is configured to produce extruded soft serve ice cream that resembles linguini noodles, while the disk 40 in FIG. 7 is configured to produce extruded soft serve ice cream that resembles fettuccini noodles. The holes 27 in the disk in FIG. 7 are longer and narrower than the holes 27 in the disk in FIG. 6. The term "about" is specifically defined herein (with reference to parallel) to mean geometrically parallel as well as include a range where the tangent line and a line through the longer surface is within 10 degrees of parallel.

Figure 5:
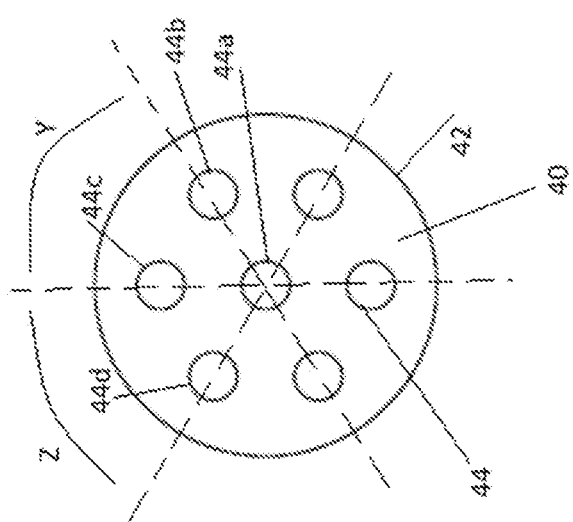
FIG. 5 is a top view of a disk for insertion into the fitting of FIG. 2, the disk being configured to extrude multiple parallel cylindrical streams of soft-serve ice cream.
Figure 8:
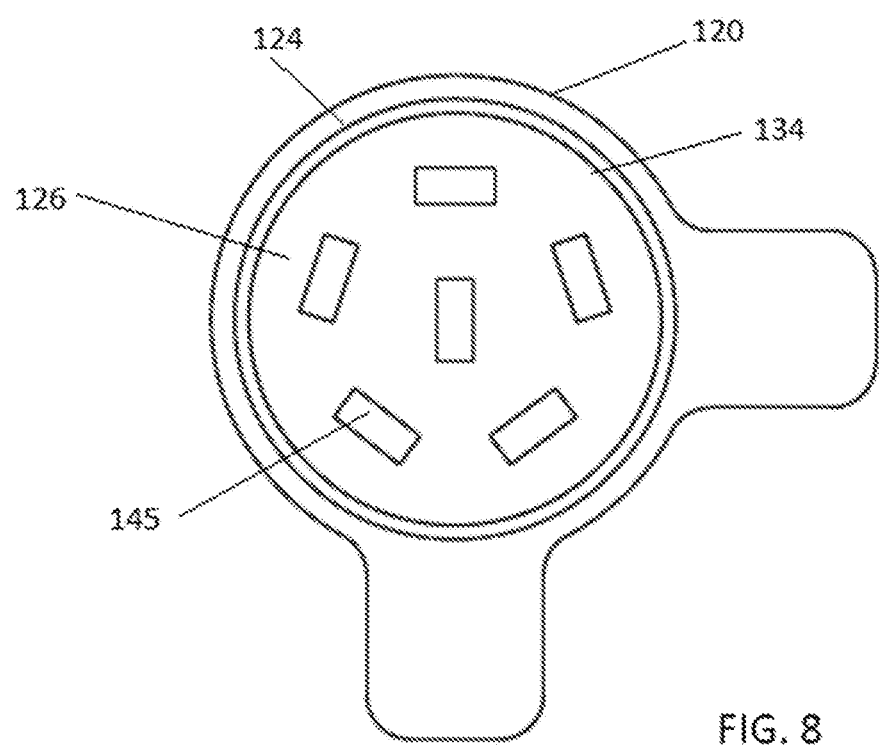
FIG. 8 is a top view of another embodiment of a fitting suitable to be disposed upon a draw valve of a conventional soft-serve ice cream machine with a hole pattern that this the same as the disk depicted in FIG. 6.
Figure 9:
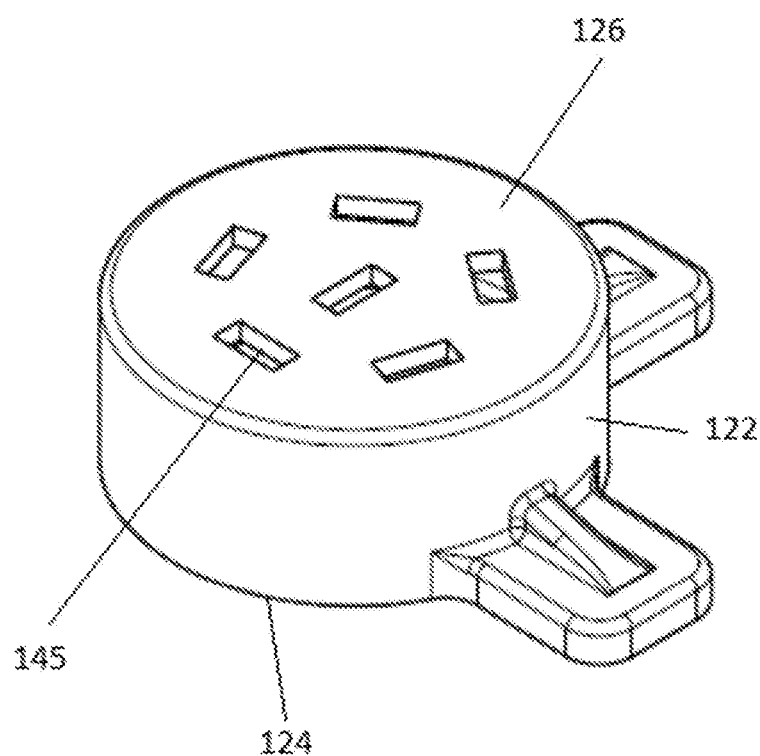
FIG. 9 is a bottom perspective view of the fitting of FIG. 8.
Figure 10:
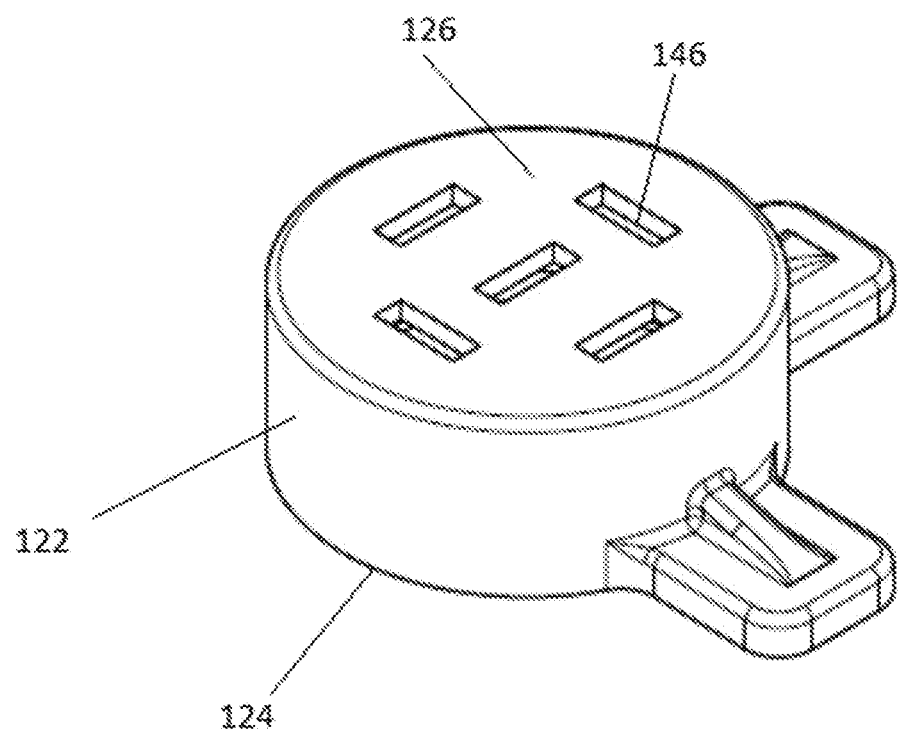
FIG. 10 is a bottom perspective view of another fitting suitable to be disposed upon a draw valve of a conventional soft-serve ice cream machine with a hole pattern that is the same as the disk depicted in FIG. 7.
Figure 11:
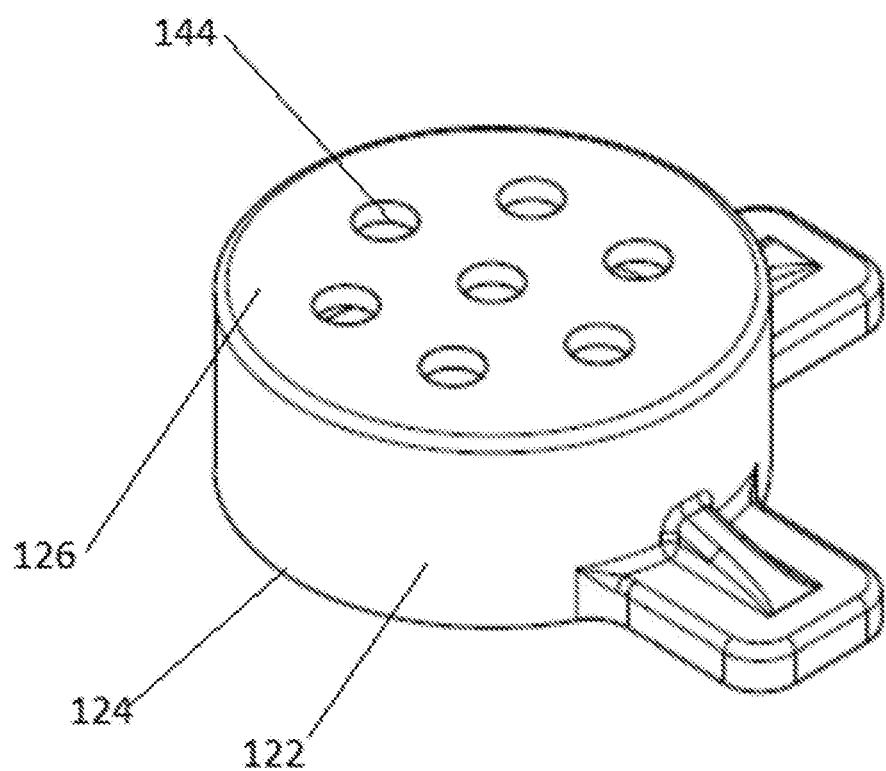
FIG. 11 is a bottom perspective view of yet another fitting suitable to be disposed upon a draw valve of a conventional soft-serve ice cream machine with a hole pattern that is the same as the disk depicted in FIG. 5.

FIG. 5 depicts a disk 40 with seven holes 44, while alternatively 4, 5, or 6 holes (or other numbers of holes). Similarly, FIG. 6 depicts a disk 40 with six holes 45, while alternatively, 4, 5, or 7 holes may be provided. Similarly, FIG. 7 depicts a disk 40 with five holes, while alternatively 4, 6, or 7 holes may be provided.

Turning now to FIGS. 8-12*a*, another embodiment of a fitting 10 is provided. The fitting 120 is similar to the fitting discussed above in many respects and components that are exactly the same as discussed above will be referenced with the same element numbers and will not be discussed in detail again here for the sake of brevity. Components that have similar construction or purpose will be depicted with a one hundred version of the same element number as the component described above, and the differences will be discussed herein as appropriate for sufficient understanding of this embodiment.

Figure 12A:
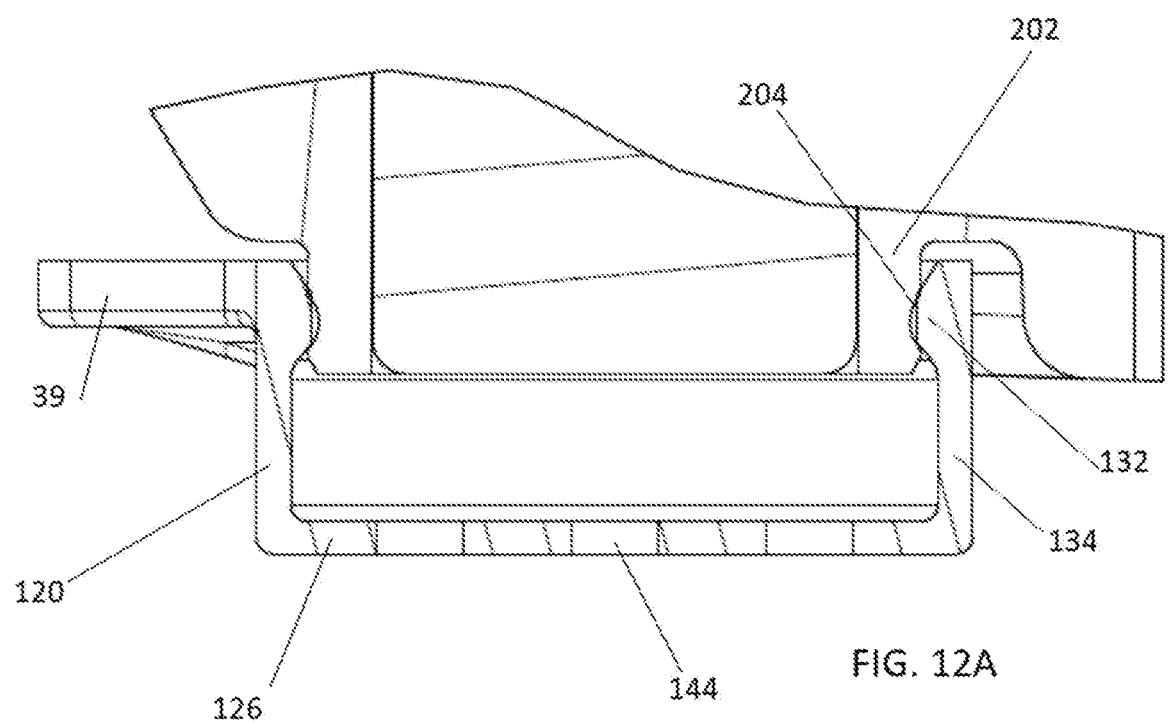
FIG. 12A is a detail view of detail B of FIG. 12, depicting an arcuate portion of the body of the fitting of FIG. 12 disposed within a recess in the draw valve.

The fitting 120 includes a body 120 that extends between an open end 124 and a partially closed end 126. In some embodiments, the body 122 may include an arcuate portion 132 (FIGS. 12 and 12*a*, and similar to arcuate portion 32 depicted in FIGS. 1*b*, 3 and 4 of the above embodiment). In embodiments with arcuate portions, the arcuate portion is provided to allow for the fitting 120 to expand as the fitting 120 is pulled over the draw valve 202, as depicted in FIG. 4*a*, above, and with the compressive forces of the body 122 applied to the draw valve 202 a large frictional force is generated that is greater than the force of soft serve ice cream (the same force as depicted as force F1 in FIG. 4 of the above embodiment) upon the partially closed end 126 to maintain the fitting 120 upon the draw valve 202 during operation of the soft serve ice cream machine. In embodiments where the draw valve 202 has a recessed portion 204 (discussed above) the arcuate portion 132 fits within the recessed portion 204 when the fitting 120 is properly aligned with the draw valve 202, as depicted in FIGS. 12 and 12*a*.

The fitting 120 may be a unitary piece that is monolithically formed such that the body 122 is formed as a single piece with the partially closed end 126. As with the above embodiment, the body 122 may be formed from an elastic material to allow the body 122 to expand when pulled upwardly with respect to the draw valve 202 by pulling the handle.

The partially closed end 126 may be a planar surface with a plurality of holes (144, 145, 146) disposed therethrough, which allow for soft serve ice cream being extruded through the holes to form a plurality of parallel flows of soft serve ice cream that resemble different types of pasta. The holes may be sized 144, 145, 146 may be sized and shaped, and positioned in the same manner as the different types of holes 27 discussed in the embodiment above, such that the holes 144 are the same as holes 44, holes 145 are the same as holes 45, and holes 146 are the same as holes 46, and the holes may be positioned in the same manner as the holes 44, 45, 46 are positioned as discussed above.

In alternate embodiments, the fitting 20/120 may connect to a distal end of a hose (or a tube or the like) 310, with the opposite end of the hose 310 connecting to the draw valve 202. In this embodiment, the soft serve ice cream is extruded through the fitting 20/120 with multiple parallel flows—as discussed above, and schematically depicted in FIG. 13—to allow the user to insert the extruded ice cream into a bowl or a plate or another container that is remote from the machine, which may be more convenient than placing the plate or bowl directly below the draw valve. For example, due to the size of the plate or the bowl the user may not be able to direct parallel flows of extruded soft serve ice cream onto all of the desired usable surfaces of the bowl or plate, while if the hose is used the ice cream may be extruded at a location where the entire desired portion of the bowl or plate can be presented with parallel flows of extruded ice cream. Similarly, with a remote flow of parallel flows of extruded soft serve ice cream, the user may be able extrude the soft serve ice cream in a more creative or in a more visually appealing manner than with directing the parallel flows of extruded soft serve ice cream directly from the draw valve to a bowl or plate positioned directly therebelow. The fitting 20/120 may be the same as the fittings discussed above, and may be installed upon the hose in the same manner as discussed above, or alternatively, the fitting may be installed upon the end of the hose in an alternate manner, such as with hose clamps or the like.

Those of skill in the art after a thorough review of the subject specification and figures will appreciate that various embodiments with disks 40 (FIGS. 2-7 or end faces 127 (FIGS. 8-12*a*) with different and other ornamental appearances will provide similar or identical functions and functional advantages to the function of the disclosed embodiments. The number, relative orientation, and the sizes of the apertures 27/127—both absolute and relative to each other and to the overall device—may be selected for visual appeal of the device and/or of the material extruded therethrough, but other embodiments with a different visual appearance having different sizes and/or proportions will provide the same functionality as the embodiments described here, including with respect to providing different, but still desirable, noodle-like appearance of soft serve ice cream or another extruded material.

The disclosed embodiments are reflected by the following numbered paragraphs:

Numbered Paragraph 1: A fitting for a machine to dispense frozen food product, comprising:
   a body with an open end at a first end of the body and a partially closed second end of the body opposite the first side of the body, the partially closed second end comprising a plurality of holes that extend therethrough, the body comprises an outer surface and an inner surface, wherein the body and the second end define an inner volume within the body;
   the inner surface includes a cylindrical portion and an arcuate portion, the arcuate portion disposed proximate to the open end and the cylindrical portion disposed between the arcuate portion and the partially closed end, wherein an inner diameter along the arcuate portion is smaller than an inner diameter along the cylindrical portion.

Numbered Paragraph 2: The fitting of Numbered Paragraph 1, wherein the inner diameter varies along the arcuate portion, wherein a central portion of the arcuate portion has a smallest inner diameter and the inner diameter of the arcuate portion increases on opposite sides of the central portion.

Numbered Paragraph 3: The fitting of Numbered Paragraph 1, wherein the body comprises an opening at the second end of the body, wherein a diameter of the opening is less than the inner diameter along the cylindrical portion, wherein a ledge extends between the opening and the inner wall of the cylindrical portion.

Numbered Paragraph 4: The fitting of Numbered Paragraph 3, wherein the inner diameter along the arcuate portion is smaller than the diameter of the opening.

Numbered Paragraph 5: The fitting of Numbered Paragraph 3, further comprising a disk that when installed rests upon the ledge, wherein the disk establishes the partially closed end and comprises the plurality of holes that extend therethrough.

Numbered Paragraph 6: The fitting of Numbered Paragraph 5, wherein the disk has a plurality of round holes, including a first round hole of the plurality of round holes is disposed at a center of the disk and remaining round holes of the plurality of round holes that are disposed at respective positions spaced radially outward from the first round hole, wherein the remaining round holes of the plurality of round holes are disposed at the same arc lengths from neighboring round holes of the remaining round holes of the plurality of round holes.

Numbered Paragraph 7: The fitting of Numbered Paragraph 5, wherein the disk has a plurality of rectangular holes, including a first rectangular hole of the plurality of rectangular holes is disposed at a center of the disk and remaining rectangular holes of the plurality of rectangular holes that are disposed at respective positions spaced radially outward from the first rectangular hole, wherein the remaining rectangular holes of the plurality of rectangular holes are disposed at the same arc lengths from neighboring rectangular holes of the remaining rectangular holes of the plurality of rectangular holes.

Numbered Paragraph 8: The fitting of Numbered Paragraph 5, wherein the disk is a plurality of disks that are configured to be individually inserted into the inner volume of the body and rest upon the ledge, wherein an outer diameter of each of the plurality of disks is larger than the inner diameter of the arcuate portion.

Numbered Paragraph 9: The fitting of Numbered Paragraph 8, wherein the body is formed from a material that is sufficiently flexible to allow opposing portions of the side walls to be urged away from each other such that the inner diameter of the arcuate portion in the direction that the opposing portions of the side walls that are urged away from each other becomes larger than the outer diameter of the disk, which allows the disk to be positioned within the inner volume or to be removed from the inner volume.

Numbered Paragraph 10: The fitting of Numbered Paragraph 8, wherein a first disk of the plurality of disks has a plurality of round holes, including a first round hole of the plurality of round holes is disposed at a center of the disk and remaining round holes of the plurality of round holes that are disposed at respective positions spaced radially outward from the first round hole, wherein the remaining round holes of the plurality of round holes are disposed at the same arc lengths from neighboring round holes of the remaining round holes of the plurality of round holes,
   and wherein a second disk of the plurality of disks has plurality of rectangular holes, including a first rectangular hole of the plurality of rectangular holes is disposed at a center of the disk and remaining rectangular holes of the plurality of rectangular holes that are disposed at respective positions spaced radially outward from the first rectangular hole, wherein the remaining rectangular holes of the plurality of rectangular holes are disposed at the same arc lengths from neighboring rectangular holes of the remaining rectangular holes of the plurality of rectangular holes.

Numbered Paragraph 11: The fitting of Numbered Paragraph 10, further comprising a third disk of the plurality of disks, wherein the third disk of the plurality of disks has a plurality of rectangular holes, wherein the plurality of rectangular holes of the second disk have longer holes than the plurality of holes in the third disk.

Numbered Paragraph 12: The fitting of Numbered Paragraph 11, wherein the rectangular holes of the second disk are configured to allow for extrusion of multiple parallel lengths of frozen food product therethrough that are shaped to mimic the size and shape of a fettucine noodle, and wherein the rectangular holes of the third disk are configured to allow for extrusion of multiple parallel lengths of frozen food product therethrough that are shaped to mimic the size and shape of a linguini noodle.

Numbered Paragraph 13: The fitting of Numbered Paragraph 1, wherein one or more handles radially extend outward from the body.

Numbered Paragraph 14: The fitting of Numbered Paragraph 1, wherein the body is configured to be removably attached to the outlet portion of a draw valve of a conventional soft serve ice cream machine, such that soft serve food product flowing through the draw valve passes through the plurality of holes of the partially closed end to define multiple parallel flows of soft serve ice cream.

Numbered Paragraph 15: The fitting of Numbered Paragraph 1, wherein the partially closed end is monolithically formed with the body.

Numbered Paragraph 16: The fitting of Numbered Paragraph 14, wherein the draw valve comprises a cylindrical outer surface and a recessed portion that is adapted to receive the arcuate portion therein when the fitting is aligned with the draw valve.

Numbered Paragraph 17: The fitting of Numbered Paragraph 1, wherein the fitting is adapted to connect to a first end of a hose, and the second end of the hose is adapted to be attached to an outlet portion of a draw valve of a conventional soft serve ice cream machine, such that the food product flowing through the draw valve passes through the hose and then through the plurality of holes of the partially closed end of the fitting to define multiple parallel flows of soft serve ice cream at a position remote from the draw valve.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A fitting for a machine to dispense frozen food product, comprising:
   a body with an open end at a first end of the body and a partially closed second end of the body opposite a first end of the body, the body including an internal volume that is collectively defined by the first end and the partially closed second end, the partially closed second end comprising a plurality of holes that extend therethrough, the body comprises an outer surface and an inner surface, wherein the body and the second end define an inner volume within the body;
   the inner surface includes a cylindrical portion and an arcuate portion, with an inner facing surface of each of the cylindrical portion and the arcuate portion establishing the internal volume, the arcuate portion disposed proximate to the open end and the cylindrical portion disposed between the arcuate portion and the partially closed end, wherein an inner diameter along the arcuate portion is smaller than an inner diameter along the cylindrical portion, such that an inner diameter of the internal volume varies along the arcuate portion, the inner diameter of the internal volume is constant along the cylindrical portion.

2. The fitting of claim 1, wherein a central portion of the arcuate portion has a smallest inner diameter and the inner diameter of the arcuate portion increases on opposite sides of the central portion.

3. The fitting of claim 1, wherein the body comprises an opening at the second end of the body, wherein a diameter of the opening is less than the inner diameter along the cylindrical portion, wherein a ledge extends between the opening and an inner wall of the cylindrical portion.

4. The fitting of claim 3, wherein the inner diameter along the arcuate portion is smaller than the diameter of the opening.

5. The fitting of claim 3, further comprising a disk that when installed rests upon the ledge, wherein the disk establishes the partially closed end and comprises the plurality of holes that extend therethrough.

6. The fitting of claim 5, wherein the disk has a plurality of round holes, including a first round hole of the plurality of round holes is disposed at a center of the disk and remaining round holes of the plurality of round holes that are disposed at respective positions spaced radially outward from the first round hole, wherein the remaining round holes of the plurality of round holes are disposed at the same arc lengths from neighboring round holes of the remaining round holes of the plurality of round holes.

7. The fitting of claim 5, wherein the disk has a plurality of rectangular holes, including a first rectangular hole of the plurality of rectangular holes is disposed at a center of the disk and remaining rectangular holes of the plurality of rectangular holes that are disposed at respective positions spaced radially outward from the first rectangular hole, wherein the remaining rectangular holes of the plurality of rectangular holes are disposed at the same arc lengths from neighboring rectangular holes of the remaining rectangular holes of the plurality of rectangular holes.

8. The fitting of claim 5, wherein the disk is a plurality of disks that are configured to be individually inserted into the inner volume of the body and rest upon the ledge, wherein an outer diameter of each of the plurality of disks is larger than the inner diameter of the arcuate portion.

9. The fitting of claim 8, wherein the body is formed from a material that is sufficiently flexible to allow opposing portions of the side walls to be urged away from each other such that the inner diameter of the arcuate portion in the direction that the opposing portions of the side walls that are urged away from each other becomes larger than the outer diameter of the disk, which allows the disk to be positioned within the inner volume or to be removed from the inner volume.

10. The fitting of claim 8, wherein a first disk of the plurality of disks has a plurality of round holes, including a first round hole of the plurality of round holes is disposed at a center of the disk and remaining round holes of the plurality of round holes that are disposed at respective positions spaced radially outward from the first round hole, wherein the remaining round holes of the plurality of round holes are disposed at the same arc lengths from neighboring round holes of the remaining round holes of the plurality of round holes,
   and wherein a second disk of the plurality of disks has plurality of rectangular holes, including a first rectangular hole of the plurality of rectangular holes is disposed at a center of the disk and remaining rectangular holes of the plurality of rectangular holes that are disposed at respective positions spaced radially outward from the first rectangular hole, wherein the remaining rectangular holes of the plurality of rectangular holes are disposed at the same arc lengths from neighboring rectangular holes of the remaining rectangular holes of the plurality of rectangular holes.

11. The fitting of claim 10, further comprising a third disk of the plurality of disks, wherein the third disk of the plurality of disks has a plurality of rectangular holes, wherein the plurality of rectangular holes of the second disk have longer holes than the plurality of holes in the third disk.

12. The fitting of claim 11, wherein the rectangular holes of the second disk are configured to allow for extrusion of multiple parallel lengths of frozen food product therethrough that are shaped to mimic the size and shape of a fettucine noodle, and wherein the rectangular holes of the third disk are configured to allow for extrusion of multiple parallel lengths of frozen food product therethrough that are shaped to mimic the size and shape of a linguini noodle.

13. The fitting of claim 1, wherein one or more handles radially extend outward from the body.

14. The fitting of claim 1, wherein the body is configured to be removably attached to the outlet portion of a draw valve of a conventional soft serve ice cream machine, such that soft serve food product flowing through the draw valve passes through the plurality of holes of the partially closed end to define multiple parallel flows of soft serve ice cream.

15. The fitting of claim 1, wherein the partially closed end is monolithically formed with the body.

16. The fitting of claim 14, wherein the draw valve comprises a cylindrical outer surface and a recessed portion that is adapted to receive the arcuate portion therein when the fitting is aligned with the draw valve.

17. The fitting of claim 1, wherein the fitting is adapted to connect to a first end of a hose, and the second end of the hose is adapted to be attached to an outlet portion of a draw valve of a conventional soft serve ice cream machine, such that the food product flowing through the draw valve passes through the hose and then through the plurality of holes of the partially closed end of the fitting to define multiple parallel flows of soft serve ice cream at a position remote from the draw valve.

18. The fitting of claim 2, wherein the body comprises an opening at the second end of the body, wherein a diameter of the opening is less than the inner diameter along the cylindrical portion, wherein a ledge extends between the opening and an inner wall of the cylindrical portion.

19. The fitting of claim 4, further comprising a disk that when installed rests upon the ledge, wherein the disk establishes the partially closed end and comprises the plurality of holes that extend therethrough.

20. A fitting for a machine to dispense frozen food product, comprising:
   a body with an open end at a first end of the body and a partially closed second end of the body opposite a first end of the body, the partially closed second end comprising a plurality of holes that extend therethrough, the body comprises an outer surface and an inner surface, wherein the body and the second end define an inner volume within the body;
   the inner surface includes a cylindrical portion and an arcuate portion, the arcuate portion disposed proximate to the open end and the cylindrical portion disposed between the arcuate portion and the partially closed end, wherein an inner diameter along the arcuate portion is smaller than an inner diameter along the cylindrical portion,
   wherein the body comprises an opening at the second end of the body, wherein a diameter of the opening is less than the inner diameter along the cylindrical portion, wherein a ledge extends between the opening and an inner wall of the cylindrical portion;
   further comprising a disk that when installed rests upon the ledge, wherein the disk establishes the partially closed end and comprises the plurality of holes that extend therethrough.

21. The fitting of claim 20, wherein the disk has a plurality of round holes, including a first round hole of the plurality of round holes is disposed at a center of the disk and remaining round holes of the plurality of round holes that are disposed at respective positions spaced radially outward from the first round hole, wherein the remaining round holes of the plurality of round holes are disposed at the same arc lengths from neighboring round holes of the remaining round holes of the plurality of round holes.

22. The fitting of claim 20, wherein the disk has a plurality of rectangular holes, including a first rectangular hole of the plurality of rectangular holes is disposed at a center of the disk and remaining rectangular holes of the plurality of rectangular holes that are disposed at respective positions spaced radially outward from the first rectangular hole, wherein the remaining rectangular holes of the plurality of rectangular holes are disposed at the same arc lengths from neighboring rectangular holes of the remaining rectangular holes of the plurality of rectangular holes.

23. The fitting of claim 20, wherein the disk is a plurality of disks that are configured to be individually inserted into the inner volume of the body and rest upon the ledge, wherein an outer diameter of each of the plurality of disks is larger than the inner diameter of the arcuate portion.

24. The fitting of claim 23, wherein the body is formed from a material that is sufficiently flexible to allow opposing portions of the side walls to be urged away from each other such that the inner diameter of the arcuate portion in the direction that the opposing portions of the side walls that are urged away from each other becomes larger than the outer diameter of the disk, which allows the disk to be positioned within the inner volume or to be removed from the inner volume.

25. The fitting of claim 23, wherein a first disk of the plurality of disks has a plurality of round holes, including a first round hole of the plurality of round holes is disposed at a center of the disk and remaining round holes of the plurality of round holes that are disposed at respective positions spaced radially outward from the first round hole, wherein the remaining round holes of the plurality of round holes are disposed at the same arc lengths from neighboring round holes of the remaining round holes of the plurality of round holes,
   and wherein a second disk of the plurality of disks has plurality of rectangular holes, including a first rectangular hole of the plurality of rectangular holes is disposed at a center of the disk and remaining rectangular holes of the plurality of rectangular holes that are disposed at respective positions spaced radially outward from the first rectangular hole, wherein the remaining rectangular holes of the plurality of rectangular holes are disposed at the same arc lengths from neighboring rectangular holes of the remaining rectangular holes of the plurality of rectangular holes.

26. The fitting of claim 25, further comprising a third disk of the plurality of disks, wherein the third disk of the plurality of disks has a plurality of rectangular holes, wherein the plurality of rectangular holes of the second disk have longer holes than the plurality of holes in the third disk.

27. The fitting of claim 26, wherein the rectangular holes of the second disk are configured to allow for extrusion of multiple parallel lengths of frozen food product therethrough that are shaped to mimic the size and shape of a fettucine noodle, and wherein the rectangular holes of the third disk are configured to allow for extrusion of multiple parallel lengths of frozen food product therethrough that are shaped to mimic the size and shape of a linguini noodle.

28. A fitting for a machine to dispense frozen food product, comprising:
   a body with an open end at a first end of the body and a partially closed second end of the body opposite a first end of the body, the partially closed second end comprising a plurality of holes that extend therethrough, the body comprises an outer surface and an inner surface, wherein the body and the second end define an inner volume within the body;
   the inner surface includes a cylindrical portion and an arcuate portion, the arcuate portion disposed proximate to the open end and the cylindrical portion disposed between the arcuate portion and the partially closed end, wherein an inner diameter along the arcuate portion is smaller than an inner diameter along the cylindrical portion, wherein the body comprises an opening at the second end of the body, wherein a diameter of the opening is less than the inner diameter along the cylindrical portion, wherein a ledge extends between the opening and an inner wall of the cylindrical portion wherein the inner diameter along the arcuate portion is smaller than the diameter of the opening;

further comprising a disk that when installed rests upon the ledge, wherein the disk establishes the partially closed end and comprises the plurality of holes that extend therethrough.

* * * * *